T. P. Sink.
Oyster-Dredge.
No. 2856
Reissued Feb. 4, 1868
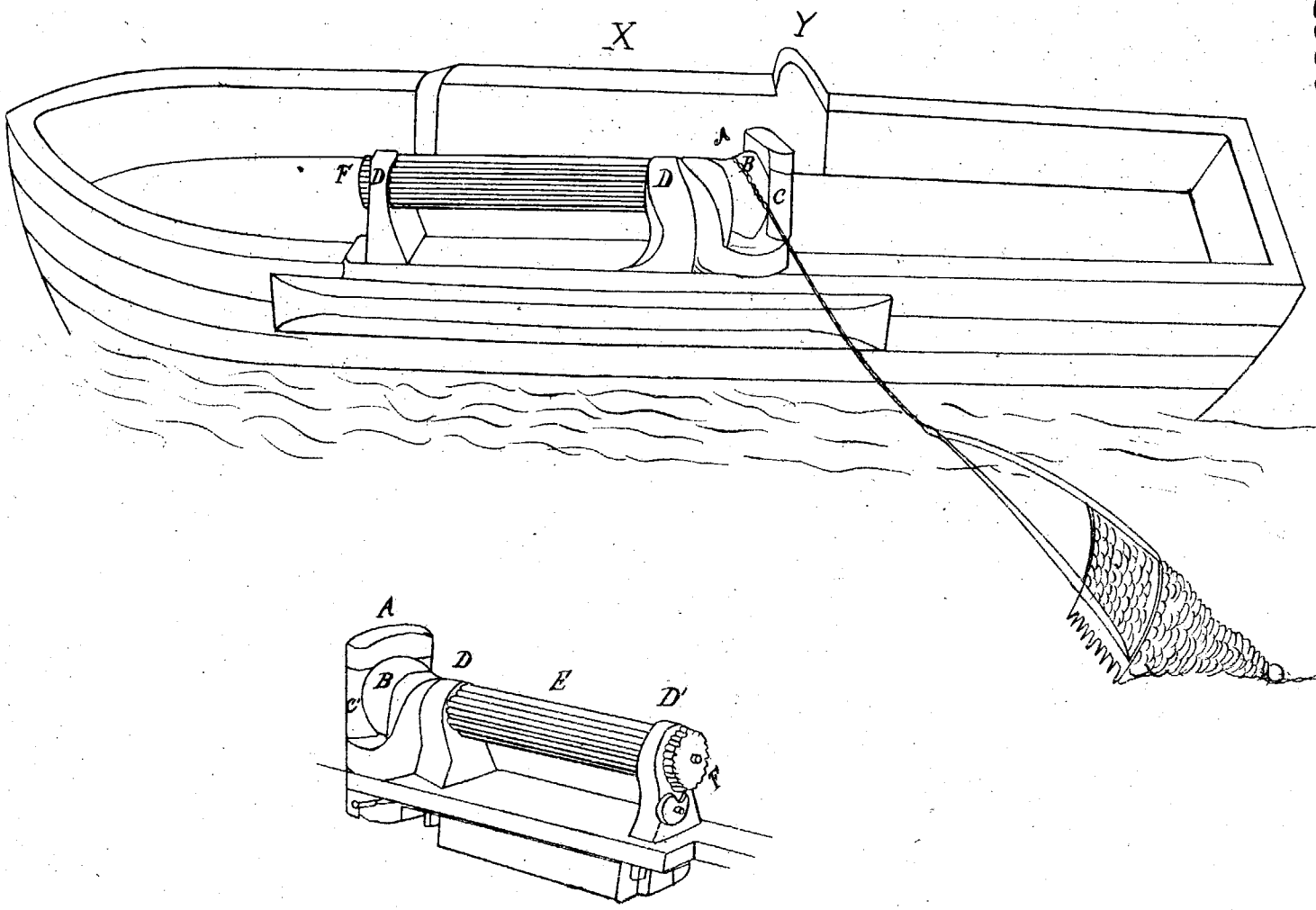

UNITED STATES PATENT OFFICE.

THOMAS P. SINK, OF FAIRTON, NEW JERSEY.

IMPROVEMENT IN OYSTER-DREDGES.

Specification forming part of Letters Patent No. 25,680, dated October 4, 1859; Reissue No. 2,856, dated February 4, 1868.

*To all whom it may concern:*

Be it known that I, THOMAS P. SINK, of Fairton, Cumberland county, New Jersey, am the owner, by mesne assignments, of certain Letters Patent for an Improvement in Oyster-Dredges granted to me on the 4th day of October, 1859; and I do hereby declare the following to be a full, clear, and exact description of the same.

My invention consists of certain devices, fully described hereinafter, to be applied to a vessel for the purpose of facilitating the operation of dredging for oysters.

In order to enable others to make and apply my invention, I will now proceed to describe the manner of carrying it into effect, reference being had to the accompanying drawing, and to the letters of reference marked thereon.

The usual appliances for facilitating the operation of dredging for oysters consist of a piece (represented by X in the drawing) affixed permanently to the gunwale of a vessel and an upright chock, Y, secured at one end of the piece X, for holding the rope to which the dredge is attached while the vessel is in motion and while the dredge is being hauled upon the deck of the boat. The dredge, when raised from the water, is drawn over the edge of the piece X until the teeth strike the same, when it becomes necessary to raise the dredge over the said piece X, in order that it may be drawn onto the deck of the boat, where its contents have to be discharged. This is an operation which demands considerable exertion, to lessen which I use a horizontal roller, E, turning freely in uprights D D′, situated at or near the point where the above-mentioned piece X is usually secured. As the dredge is being hauled in it comes in contact with and slides over the roller, which turns freely, and thus permits the dredge to be drawn to the desired position on the deck with very little exertion.

In place of the usual chock Y for the rope to bear against as the vessel is in motion and while the dredge is being hauled in, a vertical roller the face of which is beyond that of the horizontal roller may be employed; or a compound chock, which, in my opinion, is preferable, and which I will now proceed to describe, may be used.

Adjacent to the upright D for receiving one of the journals of the roller E is a block or chock, A, which has a pin projecting from its under side into a hole in a rest or bed-plate secured to the gunwale, so that the said chock or block can rotate either wholly or partly around on its own axis. In this block or chock is a groove-pulley, B, turning freely upon a pin. C C′ are vertical anti-friction rollers, turning on the edges of that face of the chock or block which is nearest to the stern of the vessel.

The face of the upright D which adjoins the chock or block should be concave, to correspond with the convex side of the chock, and these concave and convex surfaces should be as near each other as possible without interfering with the easy play of the chock.

The rope to which the dredge is attached is placed over the pulley B, which, owing to the capability of the block or chock rotating, readily adapts itself to any change in the direction which the rope may take in consequence of a change in the course of the boat as the dredge is dragged along after it.

In hauling in the dredge with its contents the rope passes across one or both of the anti-friction rollers and over the pulley, the pin of which gradually assumes a direction coinciding with that of the roller, in which position it will generally be found when the upper extremity of the dredge has been drawn up to or upon the pulley or block. By a slight forward movement of the rope the upper extremity of the dredge is then caused to slide onward upon the roller.

The diameter of the roller E should be about three inches and its length from three to five feet, according to the size of the vessel, its height and that of the uprights D and D′ corresponding with that of the chock or block.

The useful effect of the roller will be increased by fluting it, the flutes checking the tendency of the dredge to slide back into the water, especially if one of the journals of the roller E be provided with a ratchet-wheel to the teeth of which is adapted the point of a pawl, the latter preventing the roller from turning in any other direction than toward the deck.

I claim as my invention and desire to secure by Letters Patent—

1. The combination of a horizontal roller, E, turning in bearings adjacent to the gunwale of a vessel, and a horizontal grooved roller or pulley, B, substantially as and for the purpose described.

2. The combination of a horizontal roller and a vertical roller, when the outer side of the latter is beyond the outer edge of the horizontal roller, and when the said rollers are arranged in respect to each other on the gunwale of a vessel substantially as described.

3. The arrangement and combination, substantially as described, of the chock or block A, its pulley B, and the roller E, for the purpose specified.

In testimony whereof I have signed my name to this specification before two subscribing witnesses.

THOMAS P. SINK.

Witnesses:
JONATHAN WOOD,
H. S. BAMFORD.